United States Patent Office 2,751,368
Patented June 19, 1956

2,751,368
SOLUBILIZED POLYACRYLATES

John F. Yost, Noroton Heights, and Ilse B. Frederick, Glenbrook, Conn., assignors to American Cyanamid Company, New York, N. Y., a corporation of Maine No Drawing. Application June 14, 1952,
Serial No. 293,661

9 Claims. (Cl. 260—41)

The present invention relates to compositions of improved water-solubility containing polyacrylic compounds.

Although the polyacrylate salts of relatively strong bases are quite soluble in water it is difficult to form even relatively weak solutions of these salts in a reasonably brief period regardless of whether the salts are in the form of a powder or relatively coarse granules. It is thought that a concentrated solution of the polymer rapidly forms on the surfaces of the polyacrylate salt particles, that this solution gels to form the gelatinous coatings observed on the individual particles and that the coatings seal off the interior of the particles from water. This annoyance is not alleviated by first finely pulverizing the material inasmuch as the somewhat lyophilic particles tend to agglomerate into relatively large globular masses instead of dispersing on the surface or throughout the body of the aqueous solute. These floating masses are surrounded by a viscous coating while the powder on the interior thereof remains dry. It is usually a matter of hours before these globules dissolve. The difficulty of dissolving such materials also increases with an increase in molecular weight of the polymers. Polyacrylate salts, especially those derived by hydrolysis or saponification of polyacrylonitrile, are increasing in commercial importance, particularly for the purpose of conditioning or improving the structure of soil by aggregating the soil into pellets with a particle size of approximately 1/16 to 1/2". The easiest mode of application to soil is the spraying of an aqueous solution of the material hence its solubility characteristics are important. Much of the soil conditioning is being carried out by amateur gardeners and others who are untrained in and lack mechanical aids for dissolving materials of difficult solubility, and these factors intensify the problem.

An object of the invention is to solubilize reaction products of relatively strong bases with polyacrylic compounds.

Another object of the invention is to provide readily soluble compositions containing the polyacrylate salts of relatively strong bases.

A further object of the invention is to solubilize hydrolyzed polyacrylonitrile.

Other objects and advantages of the invention will be apparent to those skilled in the art especially after viewing the detailed description and examples set forth hereinbelow.

The present invention concerns flaked reaction products having a molecular weight between about 88,000 and about 265,000 of certain relatively strong bases with polymers of compounds of the group consisting of acrylic acid, acrylonitrile, acrylamide and lower alkyl acrylates. Other aspects of the invention relate to mixtures in flaked or unflaked form of such reaction products with certain polyoxyalkylene esters or fine inert solids of low bulk density or with both.

The readily soluble compositions of the present invention are directed at the reaction products of polymers of acrylic acid, acrylonitrile, acrylamide or lower alkyl acrylates with relatively strong monovalent bases. These bases should have a dissociation constant of at least $1.8 \times 10^{-5}$ at 25° C. This includes ammonium hydroxide as well as the alkaline compounds of sodium and potassium, such as the hydroxides and carbonates. The degree of polymerization of the product is important as polymer salts with molecular weights below about 88,000 are distinctly easier to dissolve and are somewhat inferior for conditioning soil whereas the viscosity of even dilute solutions, below 1%, of those above about 265,000 is excessive for handling in the usual spray equipment.

While the above limits are the best approximate measurements of actual molecular weight possible at the present time, it is realized that uncertainty still exists as to the accuracy of the molecular weight determination of such polymers. Accordingly, it is preferable to define the degree of polymerization of the preferred polymer, hydrolyzed polyacrylonitrile, in terms of the specific viscosity of the acrylonitrile polymer prior to hydrolysis with the base. This value is obtained from viscosity measurements of a solution of 1 gram of the polymer made up to 100 ml. with any suitable solvent and calculation from the following equation:

$$N_{sp} = \text{Specific viscosity} = \frac{\text{viscosity of solution}}{\text{viscosity of solvent}} - 1$$

From this the molecular weight may be calculated by the Staudinger equation:

$$\text{Molecular weight} = \frac{N_{sp}}{K_m C}$$

wherein $$K_m = 1.5 \times 10^{-4}$$

and $C$ = Concentration of the solution expressed as number of mols of the monomer (calculated) per liter of solution.

Specific viscosities of 1.5 and 4.5 respectively correspond to molecular weights of 53,000 and 159,000 for acrylonitrile polymers according to the best available present information. During hydrolysis or saponification in the manner set forth below it is probable that an average of about 75% of the nitrile radicals are converted into —COONa groups with much or all of the balance of the nitrile groups being converted into amido radicals. There is no reason to believe that any polymerization or polymer degradation occurs during this reaction; accordingly, the acrylonitrile polymers of 1.5 and 4.5 specific viscosities are converted into hydrolyzed polyacrylonitriles having a molecular weight of about 88,000 and about 265,000 respectively as may easily be computed after assuming the conversion of 75% of the nitrile groups into —COONa radicals and 25% into —CONH₂ groups. From the above, it is apparent that the molecular weight of the final polyacrylate salt is controlled by the polymerization of the acrylic monomer. However such polymerizations and their control are well known and form no part of the present invention, therefore they are not described herein. It will, of course, be realized that all of the polyacrylic compounds discussed herein are actually mixtures of polymers and that the stated molecular weights are averages for the mixtures.

Where the hydrolyzed polyacrylonitrile contains one or both of the solubilizing additives the preferred range of molecular weights extends from 117,500 up to 235,000 which corresponds to precursor acrylonitrile polymers of 2.0 and 4.0 specific viscosity. In the case of flaked hydrolyzed polyacrylonitrile containing no solubilizers the preferred range of molecular weights extends from 117,500 up to 206,000 which corresponds to polyacrylonitrile precursors with specific viscosities ranging from 2.0 up to 3.5.

The polyacrylate salts obtained by reacting sodium hydroxide or other relatively strong bases with acrylic acid, its lower alkyl esters and acrylamide are essentially sodium polyacrylates, etc. containing an even higher proportion of —COONa groups than hydrolyzed polyacrylonitrile. These substances are equivalents for the present purposes of hydrolyzed polyacrylonitrile of approximately the same molecular weight, however the latter is preferred for the compositions of this invention inasmuch as it is cheaper and easier to prepare. In connection with the polyacrylic esters, the expression "lower alkyl" is used herein to denote alkyl radicals containing from 1 to 4 carbon atoms, that is, methyl, ethyl, propyl and butyl esters.

In the hydrolysis or saponification of the acrylonitrile polymer the degree of hydrolysis may vary from about 50% up to complete hydrolysis. This is accomplished by mixing an aqueous slurry containing 12 or 13% of the polymer by weight with a 50% aqueous solution containing 0.8 mol of sodium hydroxide for each mol of acrylonitrile calculated as the monomer. The mixture is reacted at about 95° C. with continuous stirring. The resulting product has a degree of hydrolysis between 75 and 85% which is within the preferred range of 65 to 85% hydrolysis. This material contains a considerable quantity of free alkali and the addition of any suitable acid, such as sulfuric acid, is recommended in sufficient amount to neutralize the pH of a 5% solution to between 7 and 11 in order to reduce the possibility of skin irritation in handling the material.

One of the three ways of solubilizing hydrolyzed polyacrylonitrile and other polyacrylate salts is to flake the material for, surprisingly, flakes of the proper size are far easier to dissolve than powder or granules of any size. The thickness of the flakes may range from about 75 up to about 600 microns but thicknesses between 150 and 400 microns are preferred for greatest solubility. In addition, substantially all, that is at least 90% by weight, should be fine enough to pass through a 4-mesh screen and it is preferable that all of the flakes are fine enough to go through an 8-mesh screen. Although the flakes may contain a substantial amount of fines or powder this is not especially desirable. It is felt that not more than about 30% by weight should be finer than 100-mesh, and it is recommended that at least 80% by weight of the material be coarse enough to remain on an 80-mesh screen. A noteworthy benefit of the flaked material is that it permits the use of higher polymers than were formerly feasible in liquid application of the material.

It has also been found that the incorporation of certain polyoxyalkylene esters into the flakes or granules of polyacrylate salts has a strong solubilizing effect. This also permits the use of higher polymers than were heretofore feasible for solution in water. It must not be thought that any wetting or emulsifying agent will accomplish the purpose as such is not the case. For example, sulfonated fatty alcohols or Gardinols, sodium dioctyl sulfosuccinates, sodium sulfonate of alkyl oleates, etc., proved unsatisfactory for the purpose. Thus the effect appears to be specific. The class of surface active agents which are known to accomplish the desired purpose are the esters of polyoxyalkylenes or polyglycols of between 200 and 4000 molecular weight with a fatty acyl substance containing from 8 to 22 carbon atoms per acyl chain. The most desirable surface active agents are the polyoxyalkylene 400–2500 esters of 8 to 22 carbon fatty acids. Within the molecular weight limits indicated the polyoxyalkylene radical may be obtained by the polymerization of ethylene glycol, di- and triethylene glycols, ethylene oxide, propylene oxide, 1,2-propylene glycol, 1,3-propylene glycol and the like. The resulting polyether esters include the well-known polyethylene glycol esters and in the higher molecular weight ranges the carbowax esters. The fatty acyl radical may be supplied by any suitable acylating substance such as a fatty acid, amide, acyl chloride, glyceride, etc. This radical may be either saturated or unsaturated and may contain hydroxyl groups. Among the suitable fatty acids are caprylic, lauric, palmitic, stearic, behenic, palmitoleic, oleic, ricinoleic, cetoleic acids and the like. To achieve appreciable benefits from this additive at least 0.5 parts of the ester should be present per 100 parts of the polyacrylic compound and the preferred range is from 1 to 6 parts on the same basis. Quantities of polyglycol esters in excess of 10%, for example 15 or 20% or more, of the weight of the polyacrylate salt are also contemplated but these appear to offer no advantage over compositions containing smaller quantities of the esters. The polyoxyalkylene esters are effective as the sole solubilizing factor in the mixtures and they also have cumulative effects when employed in conjunction with flaked polyacrylate salts and the powdered dispersing agent described hereinbelow. To obtain the maximum solubilizing effect, it is recommended that the ester be incorporated in the particles of hydrolyzed polyacrylonitrile or other polyacrylates; that is particles containing both ester and the acrylic polymer are preferable to mixtures of particles of acrylic polymer with particles of the ester. When the mixture was flaked, another unexpected advantage due to the presence of the surface active ester was discovered. Polyacrylate salts, especially those of higher molecular weight, for instance above 147,000, have very poor flaking characteristics inasmuch as they do not scrape off of a drum drier readily onto a doctor blade. As a result a number of layers accumulate on some areas of the drum and the material is of uneven thickness and is removed from the drum in patches. For some unknown reason, when the polyglycol ester is present the polyacrylic compound is easily scraped off of the drum drier as a substantially continuous sheet of uniform thickness. This sheet is, of course, readily broken or ground into flakes of the proper size in hammer mills or other suitable equipment. However the drying and flaking of polyacrylic compounds admixed with polyoxyalkylene esters of fatty acids and optionally with the fine, light inert powdered solids described below are not included in the present invention but are described and claimed in our concurrently filed application Serial No. 293,663, now U. S. Patent 2,701,391.

It has also been found that a wide variety of fine, light inert solids of the proper physical characteristics also serve to disperse the polyacrylic compounds in water. It is recommended for the best results that these materials also be incorporated in the particles of acrylic polymer instead of merely being mixed therewith. This material is an inert solid, that is, it does not react with either the polyacrylate salt, the surface active ester or the water; in addition, it must have a compacted dry bulk density lower than about 30 pounds per cubic foot.

A suitable method of determining the compacted dry bulk density, which is also known as the tapped bulk density and settled density, is to loosely fill a 200 ml. glass graduate of about 1⅞ inches internal diameter to its top mark with the dry powdered material, and repeatedly strike the bottom of the graduate on a wooden table sharply from a height of about 1 inch. This is continued until the upper level of the powder reaches a constant level, then a reading of the compacted or settled volume of the sample is taken and the tared graduate is weighed to determine the weight of the powder sample. The tapped bulk density is easily computed from the settled volume and weight of the sample. In combination with this extreme lightness a fine material is required, for example, the median particle size should be smaller than 12 microns. The term "median" is used in its ordinary statistical sense and "particle size" is employed herein to designate the maximum dimension of a particle. All suitable materials appear to be of a nontacky nature and to possess high sorptive power. Among the broad variety of such materials are the salt water and fresh water diatomaceous earths, various hydrous silicas and silicates, gypsum, phosphate rock, etc., of extreme fineness. While a reasonably small percentage of coarse particles will not cause any substantial decrease in the effects of these fine light solids, it is preferred to use material sufficiently fine so that less than 10% by weight remains on a 200-mesh screen. Based on 100 parts by weight of the polyacrylate salt, at least 2 parts of the fine light solids are needed for an appreciable effect, and more than 20 parts produces, upon addition to water, a slurry which is too thick for certain uses and for ready drying. In general, it may be said that 5 to 15 parts per 100 of the polyacrylic compound are preferred. Like the other solubilizing factors the fine light solids may be employed with either flaked or granulated polyacrylate salts with or without a polyoxyalkylene ester additive, for the solubilizing effect of these materials is not cancelled out by the substances or particle form. In addition, it also makes the use of dry polyacrylate salts of higher molecular weight feasible for use by untrained personnel without special equipment in preparing aqueous solutions quickly. An unusual benefit derived from this agent is its effect in increasing the production of drum driers out of all proportion to the quantity of additive involved.

The compositions of the present invention are primarily intended for the improvement of soil structure by aggregating soil particles to improve the tilth, aeration, porosity, water absorption and holding capacity of the soil. Other benefits of such treatment are minimizing or eliminating erosion resulting from crusted soil and also facilitating the passage of stems or shoots of plants and grasses through the uncrusted top layer of soil. Quantities of the present composition suitable for the purpose are, of course, based upon the hydrolyzed polyacrylonitrile or other polyacrylate component as only this constituent has any soil aggregating effect. Dilute solutions are preferred as, for instance, about ¾ of 1% so that the solution will not be too viscous to spray readily from conventional equipment. The spray seldom penetrates the soil to greater depth than about ½"; therefore extremely heavy applications of the soil conditioner should not be made unless the top layer of soil is being turned or worked during the spray or between successive sprayings. In general, the rate of deposition of the polyacrylic component should vary between 10 pounds per acre for minimum noticeable effect up to a maximum of about 2000 pounds per acre but the preferred range is from 100 to 400 pounds per acre for best results. It is also contemplated that the compositions herein disclosed may be used in admixture with other substances as, for example, calcium acrylate and the like for stabilizing soil, that is, forming a tough or rubbery soil mat suitable for highways, airplane runways, earth dams and many specialized military purposes. In these instances the soil usually should be treated much more heavily and mixed more thoroughly than in the case of soil conditioning. For these purposes it is contemplated that the soil aggregating polyacrylates disclosed herein may be present in amounts up to 15% of the total weight of the treated soil. But for most purposes it is contemplated that the quantity would not exceed 5%. The compositions of the present invention may also be employed as drilling mud additives for the drilling of oil wells as their ready solubility facilitates the preparation of the drilling muds. The quantity of agent used should correspond to the quantities of hydrolyzed polyacrylonitrile conventionally used for the same purpose.

A better understanding of the invention will be obtained from the following examples which illustrate the invention and are not to be construed in a limiting sense. For comparative purposes the polyacrylic component in each instance was obtained by the hydrolysis or saponification with sodium hydroxide of acrylonitrile polymers having specific viscosities ranging from 2.8 to 4.1 (165,000 to 241,000 molecular weight, Staudinger). Unless otherwise stated all proportions are given in terms of weight. Although some dry constituents of the mixture set forth below contain varying small amounts of moisture, for example 5% by weight or less, this can be ignored since the resulting discrepancies in proportions are insignificant.

*Example A*

Hydrolyzed polyacrylonitrile derived from polyacrylonitrile of specific viscosity 4.1 was ground fine enough for 90 to 95% by weight to pass through a 60-mesh screen. 1.5 grams of this powder was added to 30 ml. of water at 70° F. in a 60 ml. bottle. The bottle was immediately stoppered and then shaken 10 times in a vigorous manner after which it was set aside for observations at appropriate intervals. It was noted that the powdered material did not tend to disperse over the surface of the water but instead tended to coagulate and form floating pasty masses. From prior examination it is known that these agglomerations have wet or pasty layers on the surface which prevent rapid permeation of water into the dry powdered material in the interior. Comparatively little of hydrolyzed polyacrylonitrile dissolved in the first 5 minutes, and it required approximately 1 hour for the polymer to dissolve completely.

*Example B*

The procedure of Example A was duplicated exactly with the hydrolyzed product of polyacrylonitrile having a specific viscosity of 2.8. The results were substantially the same as observed in Example A.

*Example 1*

| | Parts by weight |
|---|---|
| Hydrolyzed polyacrylonitrile | 87 |
| Carbowax 1000 dioleate (average molecular weight of mixed polyoxyalkylenes is approximately 1000) | 3 |
| Celite HSC (Note 1) | 10 |

NOTE 1.—A registered trademark of the Johns-Manville Corp. for a product composed of a diatomaceous earth fluxed with soda ash and then calcined. A typical analysis shows: $SiO_2$—90.0%, $Al_2O_3$—3.7% and $Na_2O$—2.5%. This material has an average particle size of from 7 to 9 microns. (Oden method) with a median particle size below 10 microns. Less than 7% by weight remains on a 150-mesh screen, and the compacted bulk density is between 14 and 17 pounds per cubic foot.

The polyoxyalkylene ester and Celite were stirred into a 20% aqueous solution containing the above weight of hydrolyzed polyacrylonitrile obtained from polymeric acrylonitrile of 4.1 specific viscosity. The mixture was then dried on a steam-heated double drum drier and ground on conventional equipment to a powder. The resulting powder was of such fineness that 90 to 95% passes through a 60-mesh screen, hence none of it retained the shape or characteristics of the sheet shown. Upon applying the solubility test of Example A to this it was found that substantially all of the water-soluble solids dissolved completely in water in less than 5 minutes.

Examples 2 to 7 inclusive set forth compositions prepared in the same manner as Example 1 from polyacrylonitrile with a specific viscosity of 4.1. All of these compositions were found to dissolve substantially completely, that is with not more than insignificant quantities of the water-soluble solids still undissolved, in 5 minutes by the solubility test of Example A.

*Example 2*

| | Parts by weight |
|---|---|
| Hydrolyzed polyacrylonitrile | 87 |
| Carbowax 1000 dioleate | 3 |
| Celite FC (Note 2) | 10 |

NOTE 2.—A registered trademark of the Johns-Manville Corp. for a product composed of natural salt water diatomaceous silica of the amorphous type with particles having a sponge-like, porous structure. A typical analysis shows: $SiO_2$—85.7%, $Al_2O_3$—3.5% and $Na_2O$—0.8%. This material has an average particle size (Oden method of 4 to 6 microns, a median particle size below 10 microns, a compacted or tapped bulk density of from 14 to 17 pounds per cubic foot and a surface area of 18 to 22 square meters per gram.

Example 3

| | Parts by weight |
|---|---|
| Hydrolyzed polyacrylonitrile | 87 |
| Polyethyleneglycol 600 monostearate (average molecular weight of the mixed polyglycol component is approximately 600) | 3 |
| Celite HSC (Note 1) | 10 |

Example 4

| | Parts by weight |
|---|---|
| Hydrolyzed polyacrylonitrile | 87 |
| Carbowax 1000 dioleate | 3 |
| Perlite (Note 3) | 10 |

NOTE 3.—This volcanic glass comprising essentially aluminum silicate was ground to a median particle size of less than 5 microns and a compacted bulk density of about 8.3 pounds per cubic foot.

Example 5

| | Parts by weight |
|---|---|
| Hydrolyzed polyacrylonitrile | 87 |
| Carbowax 1000 dioleate | 3 |
| Hi Sil (Note 4) | 10 |

NOTE 4.—A registered trademark of the Pittsburgh Plate Glass Co. for a product consisting of an extremely fine hydrated silicon dioxide of equant nature with an average particle size of 0.025 micron, a median particle size smaller than 0.1 micron, a compacted bulk density of about 7.5 pounds per cubic foot and a surface area of approximately 110 square meters per gram.

Example 6

| | Parts by weight |
|---|---|
| Hydrolyzed polyacrylonitrile | 87 |
| Polyoxyalkylene 1500–2500 monostearate (a monostearate ester of polyoxyalkylenes having a molecular weight in the 1500–2500 range) | 3 |
| Celite HSC (Note 1) | 10 |

Example 7

| | Parts by weight |
|---|---|
| Hydrolyzed polyacrylonitrile | 97 |
| Polyoxyalkylene 1500–2500 monostearate | 3 |

Examples 8 to 20 inclusive represent compositions prepared in the same manner as Example 1 which were subjected to the solubility test of Example A. After 5 minutes it was found by observation that the soluble components of the mixture had substantially but not completely dissolved, that is, it was estimated that an average of approximately 10% and in no case more than 25% of water-soluble solids remained undissolved at the end of 5 minutes.

Example 8

| | Parts by weight |
|---|---|
| Hydrolyzed polyacrylonitrile | 87 |
| Carbowax 1000 dioleate | 3 |
| Van Sil (Note 5) | 10 |

NOTE 5.—A registered trademark of the R. T. Vanderbilt Co. for a modified calcium silicate having an average particle size of 0.025 micron, a median particle size of less than 0.1 micron and a compacted bulk density of 8.5 pounds per cubic foot.

Example 9

| | Parts by weight |
|---|---|
| Hydrolyzed polyacrylonitrile | 87 |
| Carbowax 1000 dioleate | 3 |
| Isco Cel Special #1 (Note 6) | 10 |

NOTE 6.—A registered trademark of the Innis, Speiden & Co., Inc. for the hydrous form of silica known as a fresh water diatomite with the following typical analysis: $SiO_2$—93.0%, $Al_2O_3$—2.3%, $Fe_2O_3$—1.56% and $MgO$—1.34%. It has a compacted bulk density of 8 to 12 pounds per cubic foot and a median particle size below 8 microns with 95% by weight passing through a 325-mesh screen.

Example 10

| | Parts by weight |
|---|---|
| Hydrolyzed polyacrylonitrile | 87 |
| Carbowax 1000 dioleate | 3 |
| Isco Cel Special #2 (Note 7) | 10 |

NOTE 7.—A finer grade of the diatomaceous silica described in Note 6 with a tapped bulk density between 5 and 8 pounds per cubic foot, a median particle size smaller than 5 microns and with less than 1% by weight remaining on a 325-mesh screen.

Example 11

| | Parts by weight |
|---|---|
| Hydrolyzed polyacrylonitrile | 87 |
| Carbowax 1000 dioleate | 3 |
| Nytal 400 (Note 8) | 10 |

NOTE 8.—A registered trademark of the R. T. Vanderbilt Co. for a product which is essentially hydrous magnesium silicate talc of nonporous nature with 99% by weight finer than 325–mesh. The average particle size (Fischer air permeation method) is 0.8 micron and the median particle size is below 2 microns. The compacted bulk density is just under 25 pounds per cubic foot and the surface area is 9.5 square meters per gram.

Example 12

| | Parts by weight |
|---|---|
| Hydrolyzed polyacrylonitrile | 87 |
| Polyethylene glycol 400 distearate | 3 |
| Celite HSC (Note 1) | 10 |

Example 13

| | Parts by weight |
|---|---|
| Hydrolyzed polyacrylonitrile | 87 |
| Polyethylene glycol 400 monoricinoleate | 3 |
| Celite HSC (Note 1) | 10 |

Example 14

| | Parts by weight |
|---|---|
| Hydrolyzed polyacrylonitrile | 87 |
| Polyethylene glycol 400–600 oleate | 3 |
| Celite HSC (Note 1) | 10 |

Example 15

| | Parts by weight |
|---|---|
| Hydrolyzed polyacrylonitrile | 95 |
| Carbowax 1000 dioleate | 5 |

Example 16

| | Parts by weight |
|---|---|
| Hydrolyzed polyacrylonitrile | 95 |
| Polyethylene glycol 400 dioleate | 5 |

Example 17

| | Parts by weight |
|---|---|
| Hydrolyzed polyacrylonitrile | 95 |
| Polyethylene glycol 400 dilaurate | 5 |

Example 18

| | Parts by weight |
|---|---|
| Hydrolyzed polyacrylonitrile | 95 |
| Polyethylene glycol 600 monooleate | 5 |

Example 19

| | Parts by weight |
|---|---|
| Hydrolyzed polyacrylonitrile | 95 |
| Polyethylene glycol 600 dioleate | 5 |

Example 20

| | Parts by weight |
|---|---|
| Hydrolyzed polyacrylonitrile | 95 |
| Polyethylene glycol 400 mixed di- and triricinoleates | 5 |

Examples 21 through 32 are concerned with mixtures which were also prepared according to the procedure of Example 1 and tested in the manner set forth in Example A. In the solubility test these materials were classified approximately but exact time observations were not recorded. The compositions of Examples 21 to 36 inclusive gave strikingly superior results in comparison with Examples A and B but somewhat inferior solubility to the mixtures in Examples 1 to 20 inclusive.

Example 21

| | Parts by weight |
|---|---|
| Hydrolyzed polyacrylonitrile | 89 |
| Carbowax 1000 dioleate | 1 |
| Celite HSC (Note 1) | 10 |

Example 22

| | Parts by weight |
|---|---|
| Hydrolyzed polyacrylonitrile | 87 |
| Carbowax 1000 dioleate | 3 |
| Isco Cel M (Note 9) | 10 |

NOTE 9.—A somewhat coarser grade of the diatomaceous silica described in Note 6 with a median particle size less than 10 microns, a compacted bulk density between 12 and 16 pounds per cubic foot and a surface area ranging from 0.8 to 1.0 square meters per gram.

Example 23

| | Parts by weight |
|---|---|
| Hydrolyzed polyacrylonitrile | 87 |
| Carbowax 1000 dioleate | 3 |
| Attaclay SF (Note 10) | 10 |

NOTE 10.—A registered trademark of the Attapulgus Clay Co. for an Attapulgite clay consisting essentially of complex hydrated aluminum and magnesium silicates in the form of rod-like laminations. It has an average particle size of 0.4–0.6 micron and a median particle size smaller than 1 micron. The compacted bulk density is from 13 to 15 pounds per cubic foot and the surface area amounts to 120 square meters per gram.

Example 24

| | Parts by weight |
|---|---|
| Hydrolyzed polyacrylonitrile | 95 |
| Carbowax 4000 dioleate | 5 |

Example 25

| | Parts by weight |
|---|---|
| Hydrolyzed polyacrylonitrile | 95 |
| Polyethylene glycol 400 monostearate | 5 |

Example 26

| | Parts by weight |
|---|---|
| Hydrolyzed polyacrylonitrile | 95 |
| Polyethylene glycol 600 distearate | 5 |

Example 27

| | Parts by weight |
|---|---|
| Hydrolyzed polyacrylonitrile | 98 |
| Carbowax 1000 dioleate | 2 |

Example 28

| | Parts by weight |
|---|---|
| Hydrolyzed polyacrylonitrile | 90 |
| Van Sil (Note 5) | 10 |

Example 29

| | Parts by weight |
|---|---|
| Hydrolyzed polyacrylonitrile | 85 |
| Celite HSC (Note 1) | 15 |

Example 30

| | Parts by weight |
|---|---|
| Hydrolyzed polyacrylonitrile | 85 |
| Celite FC (Note 2) | 15 |

Example 31

| | Parts by weight |
|---|---|
| Hydrolyzed polyacrylonitrile | 85 |
| Hi Sil (Note 4) | 15 |

Example 32

| | Parts by weight |
|---|---|
| Hydrolyzed polyacrylonitrile | 85 |
| Perlite (Note 3) | 15 |

In reviewing the above examples, it is apparent that strong solubilizing effects may be obtained with the esters as the sole additives as indicated by Examples 6 and 15 to 20, inclusive, and further that increasing the proportion of ester enhances these effects as may be seen by comparing Examples 27 and 15. In addition Examples 29 to 32 inclusive demonstrate that the fine, light powders as the sole additives have a considerable solubilizing influence, while a comparison of these with Examples 1, 2, 4 and 5 respectively shows that, in general, the best results are secured in compositions employing both types of additives.

Example C

Hydrolyzed polyacrylonitrile obtained from polymeric acrylonitrile having a specific viscosity of 4.1 was ground and screened to yield a product finer than 100-mesh. A solubility determination was made on this material by adding 10 grams of the polymer slowly with stirring to 1 liter of water at 70° F. Again, it was noted that this material did not spread over the surface of the water but instead tended to agglomerate and form floating globular masses. The mixture was stirred moderately by hand for brief periods at frequent intervals. It was discarded after several hours upon observing that the major portion of the powdered polymer had not dissolved. This test was more severe than that employed in Example A.

Example D

Example C was repeated with no changes other than the substitution of a hydrolyzed polyacrylonitrile obtained from polyacrylonitrile with a specific viscosity of 2.8. Again over half of the polyacrylic substance failed to dissolve after several hours.

Example 33

| | Parts by weight |
|---|---|
| Hydrolyzed polyacrylonitrile | 87 |
| Carbowax 1000 dioleate | 3 |
| Celite HSC (Note 1) | 10 |

This powdered material was obtained from polyacrylonitrile with a specific viscosity of 4.1 and prepared according to Example 1 except that it was ground fine enough for 100% to pass through a 100-mesh screen. Upon subjecting the product to the solubility test set forth in Example C, it was observed that an estimated 75% of the solids dissolved in 15 minutes.

Example 34

| | Parts by weight |
|---|---|
| Hydrolyzed polyacrylonitrile | 87 |
| Carbowax 1000 dioleate | 3 |
| Celite HSC (Note 1) | 10 |

This material was prepared according to Example 1 except that a substantially continuous sheet of the dried material having a thickness of about 250–300 microns was broken up into flakes rather than ground into a powder. These flakes were relatively small since all of them were passed through an 8-mesh screen and about 80% remained on a 30-mesh screen. Upon applying the solubility test of Example C it was found that an estimated 90% of the water-soluble solids had dissolved in 5 minutes.

Example 35

| | Parts by weight |
|---|---|
| Hydrolyzed polyacrylonitrile | 97 |
| Carbowax 1000 dioleate | 3 |

The above ingredients were mixed as before, dried on a drum drier and flaked to the size mentioned in Example 34. Upon applying the solubility test described in Example C it was noted that 90% of the solids dissolved in about 9 minutes.

Example 36

Hydrolyzed polyacrylonitrile derived from polyacrylonitrile of 4.1 specific viscosity was dried and flaked to approximately the size mentioned in Example 34. This material contained none of the additives. In performing the solubility test of Example C it was observed that about 9 of the 10 grams of material were in solution after 12 minutes.

Example 37

| | Parts by weight |
|---|---|
| Hydrolyzed polyacrylonitrile | 81.4 |
| Carbowax 1000 dioleate | 8.6 |
| Celite HSC (Note 1) | 10.0 |

The procedure of Example 34 was repeated and the same results were observed.

Example 38

| | Parts by weight |
|---|---|
| Hydrolyzed polyacrylonitrile | 87 |
| Carbowax 1000 dioleate | 3 |
| Celite HSC (Note 1) | 10 |

This mixture was prepared and flaked in exactly the same manner as in Example 34 except that the specific viscosity of the polyacrylonitrile was 2.8. The product was outstanding in solubility since substantially all of the soluble solids were observed to dissolve within only 3 minutes.

Example 39

Hydrolyzed polyacrylonitrile derived from polyacrylonitrile with a specific viscosity of 2.8 was flaked to the approximate size set forth in Example 34. This material contained no solubilizing additives but it was found that at least 90% of the material dissolved in 5 minutes when subjected to the test set forth in Example C.

A study of Examples 33 to 39 demonstrates the surprising solubilizing effect of flaked polymer; for instance contrast Example 36 with C, 39 with D and 34 with 33. Moreover, the solubilizing influence of both the polyglycol esters and the fine, light powdered solids is effective with flaked as well as ground polyacrylic material; compare Examples 35 and 34 with 36 or Example 38 with 39.

It will, of course, be understood that the present invention contemplates not only the various materials mentioned above but also any other substances which are compatible with the materials set forth herein. Thus, soluble fertilizers, weed killers, insecticides and other materials used in treating soil may be added as desired to perform their usual functions.

Having described our invention what we claim as new and desire to secure by Letters Patent is:

1. A composition of matter which comprises a polyoxyalkylene 200–4000 ester of a fatty acyl substance containing from 8 to 22 carbon atoms per acyl chain, and a reaction product having a molecular weight between about 88,000 and about 265,000 of a monovalent base having a dissociation constant no smaller than $1.8 \times 10^{-5}$ with a polymer of a compound of the group consisting of acrylic acid, acrylonitrile, acrylamide and lower alkyl acrylates.

2. A composition according to claim 1 in the form of flakes.

3. A composition of matter which comprises at least about 0.5 part by weight of a polyoxyalkylene 200–4000 ester of a fatty acyl substance containing from 8 to 22 carbon atoms per acyl chain and 100 parts of a reaction product having a molecular weight between about 88,000 and about 265,000 of a monovalent base having a dissociation constant no smaller than $1.8 \times 10^{-5}$ with a polymer of a compound of the group consisting of acrylic acid, acrylonitrile, acrylamide and lower alkyl acrylates.

4. A composition of matter which comprises at least about 0.5 part by weight of a polyethylene glycol 200–4000 ester of a fatty acid containing from 8 to 22 carbon atoms and 100 parts of a reaction product having a molecular weight between 88,000 and about 265,000 of a monovalent base having a dissociation constant no smaller than $1.8 \times 10^{-5}$ with a polymer of a compound of the group consisting of acrylic acid, acrylonitrile, acrylamide and lower alkyl acrylates.

5. A composition of matter which comprises between about 0.5 and about 10.0 parts by weight of a polyoxyalkylene 200–4000 ester of a fatty acyl substance containing from 8 to 22 carbon atoms per acyl chain and 100 parts of hydrolyzed polyacrylonitrile obtained by hydrolyzing polyacrylonitrile having a specific viscosity between about 1.5 and about 4.5 with a monovalent base having a dissociation constant no smaller than $1.8 \times 10^{-5}$.

6. A flaked composition of matter which comprises between 1 and 6 parts by weight of a polyoxyalkylene 400–2500 ester of a fatty acyl substance containing from 8 to 22 carbon atoms per acyl chain and 100 parts of hydrolyzed polyacrylonitrile obtained by hydrolyzing polyacrylonitrile having a specific viscosity between 2.0 and 4.0 with a monovalent base having a dissociation constant no smaller than $1.8 \times 10^{-5}$; substantially all of said flakes being between 150 and 400 microns in thickness and finer than 8-mesh with not more than about 20% by weight finer than 80-mesh.

7. A composition of matter which comprises a polyoxyalkylene 200–4000 ester of a fatty acyl substance containing from 8 to 22 carbon atoms per acyl chain, between 2 and 20 parts by weight of an inert nontacky solid of high sorptive power having a median particle size smaller than 12 microns and a compacted dry bulk density less than 30 pounds per cubic foot, and 100 parts of a reaction product having a molecular weight between about 88,000 and about 265,000 of a monovalent base having a dissociation constant no smaller than $1.8 \times 10^{-5}$ with a polymer of a compound consisting of acrylic acid, acrylonitrile, acrylamide and lower alkyl acrylates.

8. A flaked composition of matter which comprises between about 0.5 and about 10.0 parts by weight of a polyoxyalkylene 200–4000 ester of a fatty acyl substance containing from 8 to 22 carbon atoms per acyl chain, between 2 and 20 parts of an inert nontacky solid of high sorptive power having a median particle size smaller than 12 microns and a compacted dry bulk density below 30 pounds per cubic foot, and 100 parts of hydrolyzed polyacrylonitrile obtained by hydrolyzing polyacrylonitrile having a specific viscosity between 1.5 and 4.5 with a monovalent base having a dissociation constant no smaller than $1.8 \times 10^{-5}$; substantially all of said flakes being between about 75 and about 600 microns in thickness and finer than 4-mesh with not more than about 30% by weight finer than 100-mesh.

9. A flaked composition of matter which comprises between 1 and 6 parts by weight of a polyoxyalkylene 400–2500 ester of a fatty acyl substance containing from 8 to 22 carbon atoms per acyl chain, between 5 and 15 parts of an inert nontacky solid of high sorptive power having a median particle size smaller than 12 microns and a compacted dry bulk density less than 25 pounds per cubic foot, and 100 parts of hydrolyzed polyacrylonitrile obtained by hydrolyzing polyacrylonitrile having a specific viscosity between 2.0 and 4.0 with a monovalent base having a dissociation constant no smaller than $1.8 \times 10^{-5}$; substantially all of said flakes being between 150 and 400 microns in thickness and finer than 8-mesh with not more than about 20% by weight finer than 80-mesh.

References Cited in the file of this patent

UNITED STATES PATENTS

| 2,317,328 | Kinney | Apr. 20, 1943 |
| 2,552,775 | Fischer et al. | May 15, 1951 |
| 2,651,883 | Hedrick et al. | Sept. 15, 1953 |

FOREIGN PATENTS

| 501,726 | Belgium | Mar. 7, 1951 |